April 6, 1965  J. L. WYATT  3,177,465
FISH HERDER

Filed Oct. 29, 1962  2 Sheets-Sheet 1

John L. Wyatt
INVENTOR.

April 6, 1965 J. L. WYATT 3,177,465
FISH HERDER
Filed Oct. 29, 1962 2 Sheets-Sheet 2

John L. Wyatt
INVENTOR.

3,177,465
FISH HERDER
John L. Wyatt, 14 W. Hull St., Savannah, Ga.
Filed Oct. 29, 1962, Ser. No. 233,638
9 Claims. (Cl. 340—5)

This invention comprises a novel and useful fish herder and more particularly pertains to a sonic device for attracting and herding fish to the vicinity of the device.

It is well known that fish can detect and are responsive to various sounds. The present invention is based upon the discovery that musical sounds in particularly apparently possess a great attraction or fascination for fish such that they tend to converge and congregate in the vicinity of such sounds from a considerable distance away.

It is therefore the primary object of this invention to provide a fish herder and attractor which will generate musical sounds and acoustically couple such sound to the sub-surface water in order to provide a lure and attractor for fish.

A further object of the invention is to provide a device in accordance with the foregoing objects which will enable the use of a small compact radio receiver such as a transistor set or battery set whereby the operation of the receiver will be rendered independent of the requirement for power lines and the like.

A further object of the invention is to provide a device in accordance with the preceding objects wherein the generator of musical sounds shall be protectively and efficiently housed within the device itself and placed thereby in acoustical connection with the sub-surface water to assure a more effective transmission of the musical sounds directly into the water and thus enhance the efficiency of the device as an attractor or herder for fish.

A still further object of the invention is to provide a device in accordance with the preceding objects which shall include means enabling the device and its associated radio receiver to be adjustably oriented with respect to a remote radio transmitting unit to render the use of the device effective over considerable distances from a radio station.

A still further purpose of the invention is to provide a device in compliance with the preceding objects in which the orienting means shall also serve as a stabilizer for the buoyant device, especially in relatively rough waters and yet shall be capable of compactly folding into a small volume to facilitate storage and transportation of the device when not in use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

The fish herder in accordance with this invention consists of a buoyant body indicated generally by the numeral 10 and which preferably, although not necessarily limited thereto, is of a frusto-pyramidal shape. Thus, the device includes a plurality of panels 12 each comprising a side thereof together with a relatively flat top 14 at its upper end, the sides being downwardly divergent and open at their bottom. The material of the buoyant body may be of any desired character and particularly such materials as will provide the requisite strength, resistance to moisture and yet have good acoustical soundboard properties. Obviously the device may be made in various sizes.

Figure 3:
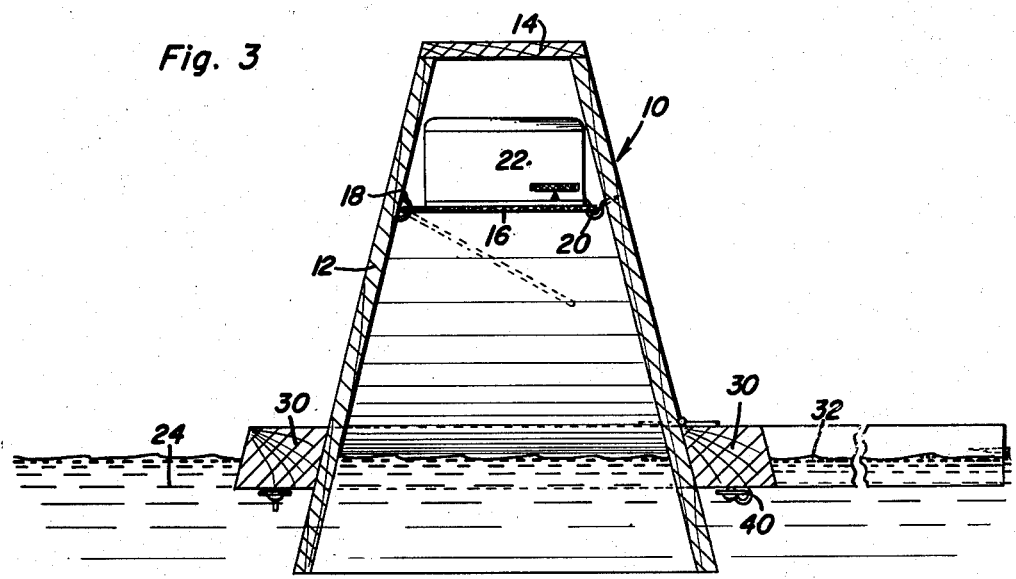
FIGURE 3 is a view in vertical transverse section taken substantially upon the plane indicated by the section line 3—3 of FIGURE 1 and showing the internal construction and arrangement of the device; and, FIGURE 4 is a fragmentary bottom plan view of the device in its operative position.
Figure 4:
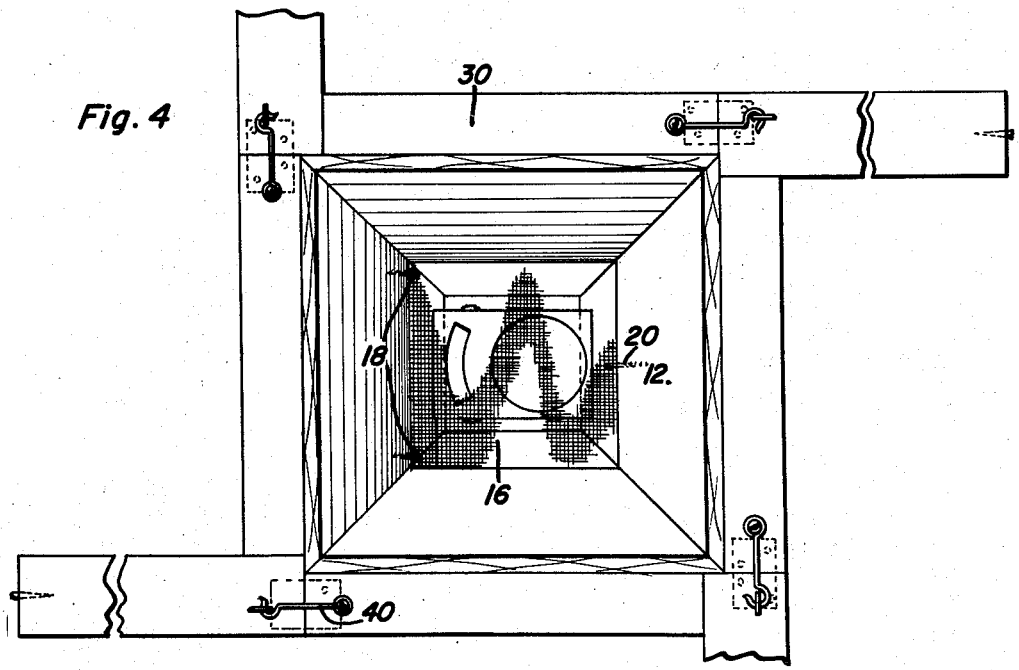

In the upper or apex portion of the hollow device there is provided a supporting platform 16 such as a wire screen or the like which may be hingedly mounted upon one of the side walls as by means of the hinged fasteners 18 and may be secured releasably in a horizontal position as by an eye hook or the like as at 20. The shelf 16 is shown in its operative position in full lines in FIGURE 3, while in dotted lines it is shown in open position. The shelf is open to permit the insertion of or the removal of a musical vibration generator 22. This generator for practical purposes may conveniently consist of a portable radio receiver such as a transistor or a battery set. When it is desired to use the device as a fish herder or attractor, the radio receiver 22 is placed in the upper end of the hollow interior of the buoyant body 10 and is retained upon the shelf or tray 16. When so placed, it will be apparent that the audible sound waves produced by the receiver will pass downwardly through the airspace in the interior of the body and thus by this means and by virtue of the sounding board effect of the side panels 12, will be acoustically coupled and connected to the water 24 in which the buoyant body is floated, and preferably will be discharged from the air chamber and the air column into the water at a depth below the surface depending upon the depth to which the lower ends of the side walls 12 are immersed. It will be appreciated that the weight of the body, and other suitable ballast applied thereto if desired, will be such as to effect the desired depth of the open lower end of the hollow body below the surface of the water.

Inasmuch as the radio receiver when once placed in the buoyant body can be oriented with respect to a remote radio transmitting station for effective reception therefrom only by an appropriate turning of the buoyant body about its vertical longitudinal axis, it is necessary to provide some means for effecting this turning movement in order to orient and to anchor the body in the proper position for effective radio reception by the radio receiver therein.

Figure 1:
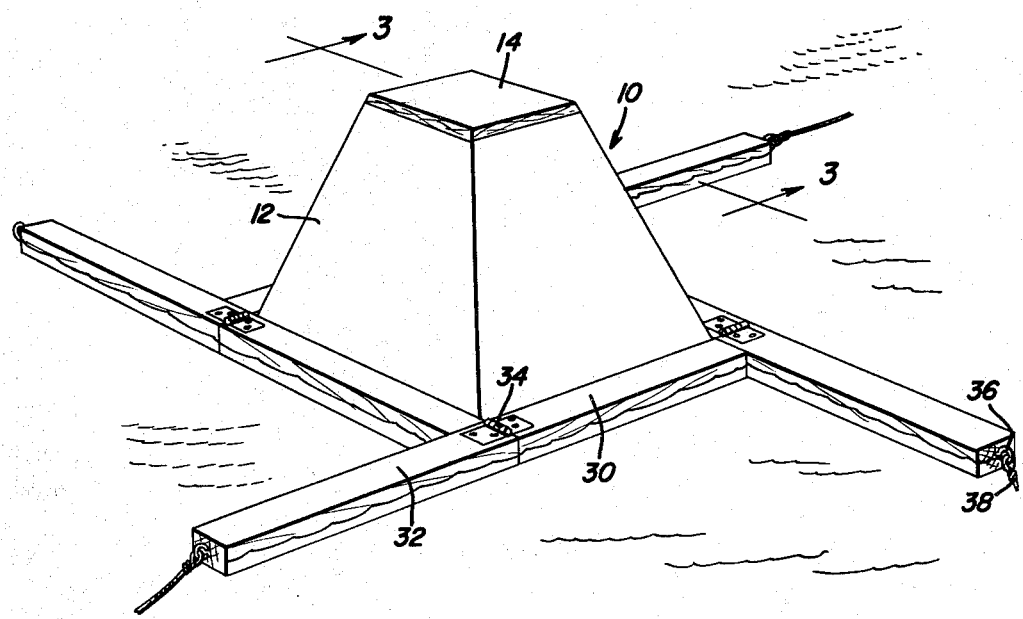
FIGURE 1 is a perspective view showing the fish herder in accordance with this invention in its assembled operative position.
Figure 2:
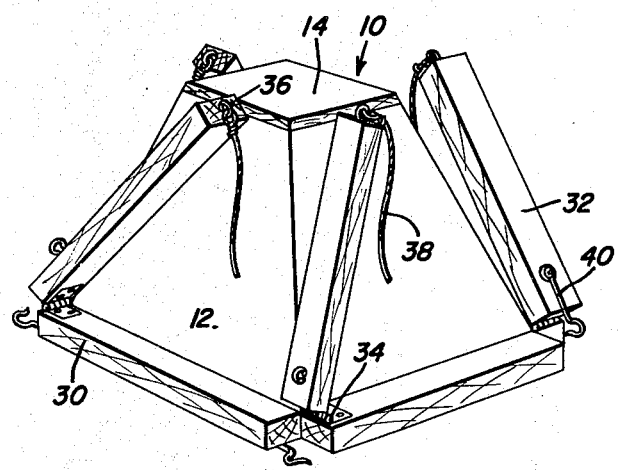
FIGURE 2 is a perspective view similar to FIGURE 1 but showing the device with its stabilizing arms in a compactly folded position ready for transportation or storage.

For this purpose, there are provided upon the exterior surface of the body a series of laterally projecting support members 30 each secured to the body in any desired manner. At the end of each support member there is provided a stabilizing or outrigger leg 32 which is hingedly connected as at 34 to the corresponding support member for vertical swinging movement about a horizontal axis lying along the plane of a side panel 12. The arrangement is such that the outrigger legs 32 may be readily folded between a collapsed position, partially shown in FIGURE 2 in which collapsed position they will lie upon the hinged support members 30, or a horizontally extended position shown in FIGURE 1 in which they will project sufficiently beyond the sides of the buoyant body to provide stabilizing outriggers therefor as well as anchor means. At their outer extremities, each of the legs 32 is provided with an eye hook as at 36 to which a guy wire 38 is attached. Thus each of the four outriggers shown in FIGURE 1 may be moored or anchored to any suitable fixed supports and thus maintain the buoyant body in a desired oriented rotationally adjusted position in order to properly align the radio receiver 22 for most effective reception from a selected remote transmitting station.

In order to retain the outriggers in their horizontally extended positions, a conventional type of fastener such as a hook and eye fastener 40 may be provided for each of the outrigger arms 32 and its associated support 30.

It will thus be apparent that in the collapsed position the maximum over-all cross-sectional area of the buoyant body is only the square which bounds the four supports 30 inasmuch as the legs 32 will be each folded directly down upon and rest upon its corresponding attached support. However, in use, the legs 32 are extended to their horizontal positions, are locked therein by the fasteners 40 and by manipulation of the guy wires 38 are adjusted to rotate the body and thus properly tune the radio receiver 22 with respect to a selected transmitting station to obtain maximum reception therefrom. It will be appreciated that a station is selected which will produce music since it has been found that the musical vibrations are much more effective and efficient as a fish attracting means than are such other sounds as those produced by electric buzzers and the like.

It will be further appreciated that the buoyant body not only serves as a means to support and house the receiver 22, but also serves as the acoustical coupling so that a sound chamber provided by the air column within the hollow open lower portion of the body will acoustically couple the audible sound waves emitted by the receiver 22 with the water 24 below the surface thereof. It has been found that this arrangement obtains maximum efficiency in the use of the musical sounds enabling them to travel for greater distances than if they were acoustically coupled to the water at the surface thereof.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fish herder comprising a buoyant body, a radio receiver carried by said body out of direct contact with the water in which said body floats, said radio receiver broadcasting music and means for acoustically coupling said music with the water for attracting fish to the vicinity of the body, said buoyant body comprising a hollow vessel with downwardly divergent sides and having an open bottom and with the lower edges of said sides being immersed in water, said radio receiver being mounted in the hollow interior of said vessel above the water level therein.

2. The combination of claim 1 including means for anchoring said body in horizontally adjusted positions for orienting said receiver with respect to a remote radio transmitter.

3. The combination of claim 2 wherein said anchoring means include a plurality of outwardly directed, horizontally extending legs and a guy wire anchored to each leg.

4. The combination of claim 3 including means whereby said legs are hingedly mounted for folding movement upon said body for compact collapsing of said body.

5. A fish herder comprising a buoyant body, a radio receiver carried by said body out of direct contact with the water in which said body floats, said radio receiver broadcasting music and means for acoustically coupling said music with the water for attracting fish to the vicinity of the body, said acoustical coupling means comprising downwardly divergent body side walls defining a sound chamber in said body into which said water reaches, said receiver being disposed in said sound chamber above the water level therein.

6. A sonic fish herder and lure comprising a hollow buoyant body having a closed top together with downwardly divergent sound vibration transmitting side walls defining a sound chamber with an open bottom, said body having the lower portions of its side walls immersed in water upon which said body floats, the level of said water extending into said chamber above the lower ends of said side walls whereby said chamber is sealed from the atmosphere, a musical sound producer in said chamber, means in said chamber supporting said producer above said water level therein, said producer being acoustically coupled to the water surface by the sound vibration transmitting air trapped in said chamber and being acoustically coupled to the sub-surface water by the immersion of the lower portion of said sound vibration transmitting side walls.

7. The combination of claim 6 wherein said supporting means comprises a releasable shelf secured to said side walls and enabling access to said producer, said shelf being sound permeable.

8. The combination of claim 6 wherein said producer is a radio receiver and sound broadcaster, means on said body effecting anchoring of said body and adjustable orientation of said body and receiver relative to a radio broadcasting station.

9. The combination of claim 8 wherein said last-mentioned means comprises a plurality of legs, means hinging each leg for folding movement between a retracted stored position upon the body and within the confines of and against a corresponding side and an expanded position in side-by-side relation with and projecting laterally from the corresponding body side.

References Cited by the Examiner

UNITED STATES PATENTS

| | | | |
|---|---|---|---|
| 1,709,890 | 4/29 | Wilckens | 340—12 |
| 2,164,858 | 7/39 | West | 340—12 |
| 2,757,475 | 8/56 | Pankove | 340—5 X |
| 2,927,391 | 3/60 | Herter | 43—17.1 |
| 3,098,211 | 7/63 | Gerber | 340—5 X |

FOREIGN PATENTS 736,652    9/55    Great Britain.

CHESTER L. JUSTUS, *Primary Examiner.*